United States Patent
Yang et al.

(10) Patent No.: US 11,102,831 B2
(45) Date of Patent: *Aug. 24, 2021

(54) METHOD FOR PERFORMING MEASUREMENT IN EN-DC CASE, AND USER EQUIPMENT THEREFOR

(71) Applicant: LG Electronics Inc., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 125 days.

This patent is subject to a terminal disclaimer.

(21) Appl. No.: 16/454,388

(22) Filed: Jun. 27, 2019

(65) Prior Publication Data

US 2019/0327781 A1   Oct. 24, 2019

Related U.S. Application Data

(63) Continuation of application No. 16/249,726, filed on Jan. 16, 2019, now Pat. No. 10,397,973, which is a
(Continued)

(51) Int. Cl.
*H04W 76/15* (2018.01)
*H04L 5/00* (2006.01)
(Continued)

(52) U.S. Cl.
CPC .......... *H04W 76/15* (2018.02); *H04L 5/0007* (2013.01); *H04L 5/0094* (2013.01);
(Continued)

(58) Field of Classification Search
CPC ... H04W 76/15; H04W 24/10; H04W 56/001; H04W 88/02; H04W 72/0446; H04L 5/0094; H04L 5/1469
See application file for complete search history.

(56) References Cited

U.S. PATENT DOCUMENTS

| 2016/0165465 | A1 | 6/2016 | Park et al. |
| 2018/0049047 | A1 | 2/2018 | Lin et al. |
| 2019/0090151 | A1* | 3/2019 | Yiu .................. H04W 24/10 |

FOREIGN PATENT DOCUMENTS

| KR | 1020160101127 A | 8/2016 |
| KR | 1020160130286 A | 11/2016 |

(Continued)

OTHER PUBLICATIONS

LG Electronics, "Discussion on measurement applicability in mixed numerology in NR", 3GPP TSG-RAN WG4 Meeting, #84bis, Oct. 9-13, 2017, R4-1710612.

(Continued)

*Primary Examiner* — Jianye Wu

(74) *Attorney, Agent, or Firm* — Dentons US LLP

(57) ABSTRACT

Provided is a method for performing measurement by a user equipment (UE). The method may include receiving, by the UE, configuration information on a measurement gap. The UE may be configured with a dual connectivity (DC) to an evolved universal terrestrial radio access (E-UTRA) cell and a new radio access technology (NR) cell. The configuration information on the measurement gap may include a measurement gap length (MGL). The MGL may include one of 3 ms, 4 ms and 6 ms. The method may include determining a total number of slots to be interrupted during the MGL, and performing the measurement during the MGL. The total number of slots to be interrupted may be determined based on a subcarrier spacing (SCS) of the NR cell and the MGL.

13 Claims, 16 Drawing Sheets measurement gap with MGL=N for Asynchronous EN-DC

Related U.S. Application Data continuation of application No. PCT/KR2018/011667, filed on Oct. 2, 2018.

(60) Provisional application No. 62/586,189, filed on Nov. 15, 2017.

(51) Int. Cl.
| | | |
|---|---|---|
| *H04W 24/10* | (2009.01) | |
| *H04L 5/14* | (2006.01) | |
| *H04W 56/00* | (2009.01) | |
| *H04W 88/02* | (2009.01) | |
| *H04W 72/04* | (2009.01) | |

(52) U.S. Cl.
CPC .......... *H04L 5/1469* (2013.01); *H04W 24/10* (2013.01); *H04W 56/001* (2013.01); *H04W 72/0446* (2013.01); *H04W 88/02* (2013.01); *H04L 5/001* (2013.01); *H04L 5/005* (2013.01); *H04L 5/0035* (2013.01)

(56) References Cited

FOREIGN PATENT DOCUMENTS

| KR | 1020160147774 A | 12/2016 |
|---|---|---|
| KR | 1020170081203 A | 7/2017 |

OTHER PUBLICATIONS

LG Electronics, "Discussion on total interruption time by measurement gap for EN DC", 3GPP TSG-RAN WG4 Meeting, #85, Nov. 27-Dec. 1, 2017, R4-1712759.

LG Electronics, "TP for TS 38.133 on total interruption time on SCG during MGL for Rel-15 EN-DC", 3GPP TSG-RAN WG4 Meeting #85, Nov. 27-Dec. 1, 2017, R4-1712760.

LG Electronics Inc., "Measurement gap considering beam", 3GPP TSG-RAN2 #99, Aug. 21-25, 2017, R2-1709131.

Vivo, "Consideration on measurement gap in NR", 3GPP TSG-RAN WG2 Meeting #99bis, Oct. 9-13, 2017, R2-1710937.

Samsung: "Measurement Gap Configuration for EN-DC", R2-1711299, 3GPP TSG RAN WG2 Meeting #99bis, Prague, Czech Republic, Oct. 9-13, 2017.

Mediatek Inc.: "Discussion on CSI-RS for L3 Mobility", R1-1714268, 3GPP TSG RAN WG2 Meeting #90, Prague, Czech Republic, Aug. 21-25, 2017.

Intel Corporation: "Measurement gap in NR", R2-1710591, 3GPP TSG RAN WG2 Meeting #99bis, Prague, Czech Republic, Oct. 9-13, 2017.

Intel Corporation: "On MGRP and MGL for NR", R4-1710367, 3GPP TSG RAN4 WG2 Meeting #84bis, Dubrovnik, Croatia, Oct. 9-13, 2017.

Huawei: "Measurement gap configuration in NR", R2-1710574, 3GPP TSG RAN WG2 Meeting #99bis, Prague, Czech Republic, Oct. 9-13, 2017.

* cited by examiner

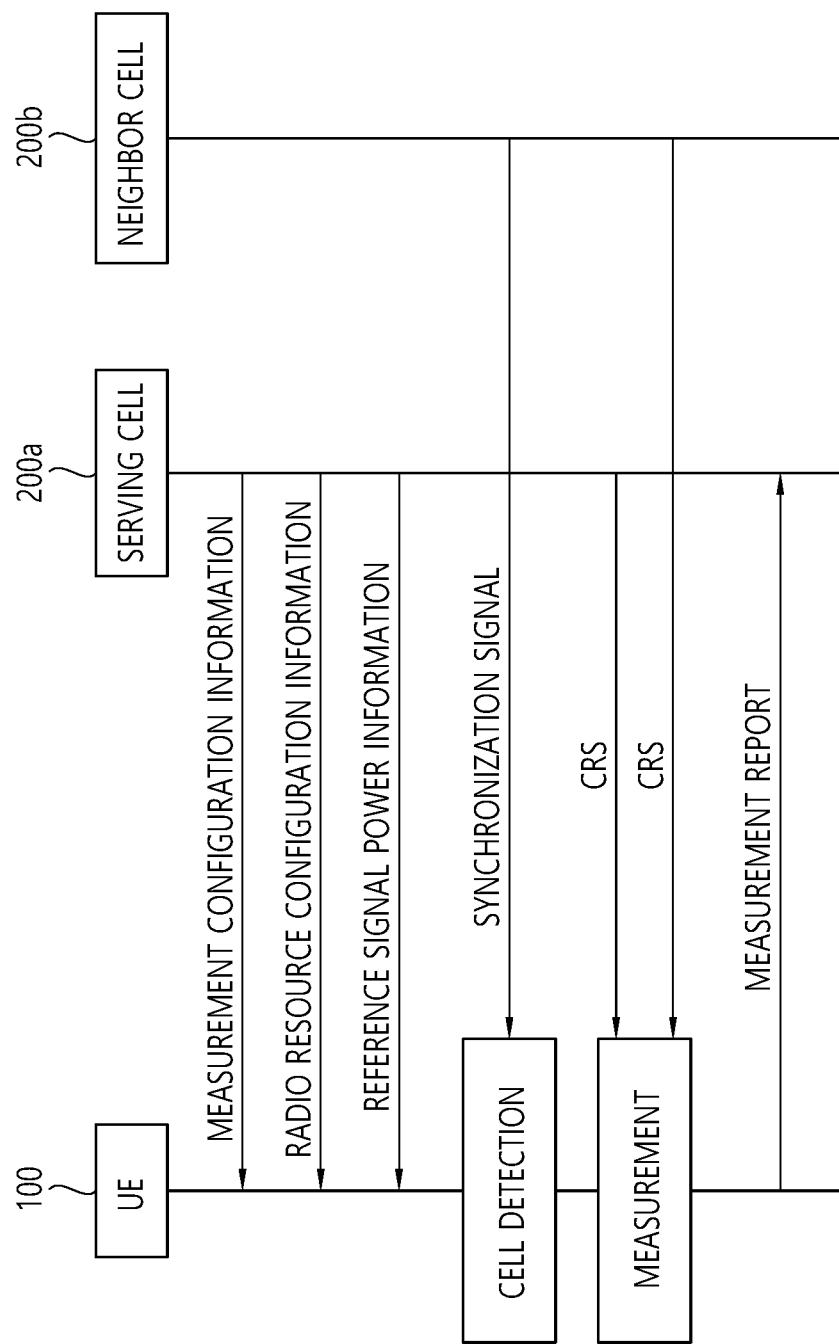

METHOD FOR PERFORMING MEASUREMENT IN EN-DC CASE, AND USER EQUIPMENT THEREFOR

CROSS-REFERENCE TO RELATED APPLICATIONS

Pursuant to 35 U.S.C. § 119(e), this application is a continuation application of U.S. patent application Ser. No. 16/249,726, filed on Jan. 16, 2019, which is a continuation of International Application PCT/KR2018/011667, with an international filing date of Oct. 2, 2018, which claims the benefit of U.S. Provisional Patent Application No. 62/586,189, filed on Nov. 15, 2017, the contents of which are hereby incorporated by reference herein in its entirety.

BACKGROUND OF THE INVENTION

Field of the Invention

The present invention relates to mobile communication.

Related Art

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

An NR cell may operate not just in standalone deployment (SA), but also in a non-standalone deployment (NSA). According to the NSA deployment, a UE may be connected in dual connectivity (DC) with an E-UTRAN (that is, LTE/LTE-A) cell and the NR cell. This type of dual connectivity is called EN-DC.

Meanwhile, in order to perform measure of a cell of a different RAT, a measurement gap is required.

However, a measurement gap for EN-DC has not ben studied and researched and thus it is difficult to technically realize the measurement gap for EN-DC.

SUMMARY OF THE INVENTION

Accordingly, a disclosure of the present specification has been made in an effort to solve the aforementioned problem.

Accordingly, in an effort to solve the aforementioned problem, a disclosure of the present specification provides a method for performing measurements. The method may be performed by a user equipment (UE) and comprise: receiving, by the UE, configuration information on a measurement gap. The UE may be configured with a dual connectivity (DC) to an evolved universal terrestrial radio access (E-UTRA) cell and a new radio access technology (NR) cell. The configuration information on the measurement gap may include a measurement gap length (MGL). The MGL may include one of 3 ms, 4 ms and 6 ms. The method may comprise: determining a total number of slots to be interrupted during the MGL and performing the measurement during the MGL. The total number of slots to be interrupted may be determined based on a subcarrier spacing (SCS) of the NR cell and the MGL.

The DC to the E-UTRA cell and the NR cell (EN-DC) may be configured as either asynchronous or synchronous.

During the MGL, the UE may do not receive any downlink data.

The SCS of the NR cell may include at least one of 15 kHz, 30 kHz, 60 kHz and 120 kHz.

When the MGL is 6 ms, the total number of slots to be interrupted may be determined
as one of:
7 for a SCS of 15 kHz,
13 for a SCS of 30 kHz,
25 for a SCS of 60 kHz and
49 for a SCS of 120 kHz.

When the MGL is 4 ms, the total number of slots to be interrupted may be determined
as one of:
5 for a SCS of 15 kHz,
9 for a SCS of 30 kHz,
17 for a SCS of 60 kHz and
33 for a SCS of 120 kHz.

When the MGL is 3 ms, the total number of slots to be interrupted may be determined
as one of:
4 for a SCS of 15 kHz,
7 for a SCS of 30 kHz,
13 for a SCS of 60 kHz and
25 for a SCS of 120 kHz.

The E-UTRA cell may belong to a master cell group (MCG) in the DC, and the NR cell may belong to a secondary cell group (SCG) in the DC.

The interruption may be happened on a SCG.

Accordingly, in an effort to solve the aforementioned problem, a disclosure of the present specification provides a user equipment (UE) for performing measurements. The UE may comprise: a transceiver which receives configuration information on a measurement gap. The transceiver may be configured with a dual connectivity (DC) to an evolved universal terrestrial radio access (E-UTRA) cell and a new radio access technology (NR) cell. The configuration information on the measurement gap may include a measurement gap length (MGL). The MGL may include one of 3 ms, 4 ms and 6 ms. The UE may comprise: a processor which determines a total number of slots to be interrupted during the MGL and performs the measurement during the MGL. The total number of slots to be interrupted may be determined based on a subcarrier spacing (SCS) of the NR cell and the MGL.

According to the disclosure of the present invention, the problem of the conventional technology described above may be solved.

BRIEF DESCRIPTION OF THE DRAWINGS

FIG. 3 illustrates a procedure for cell detection and measurement.

DESCRIPTION OF EXEMPLARY EMBODIMENTS

Figure 1:
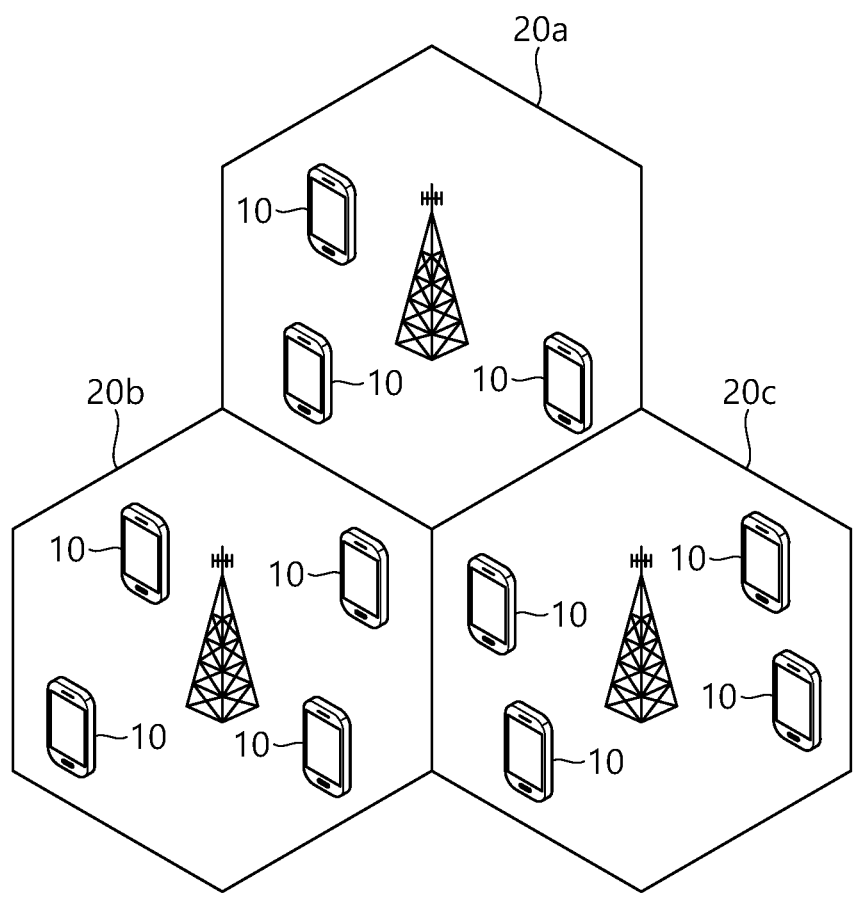
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
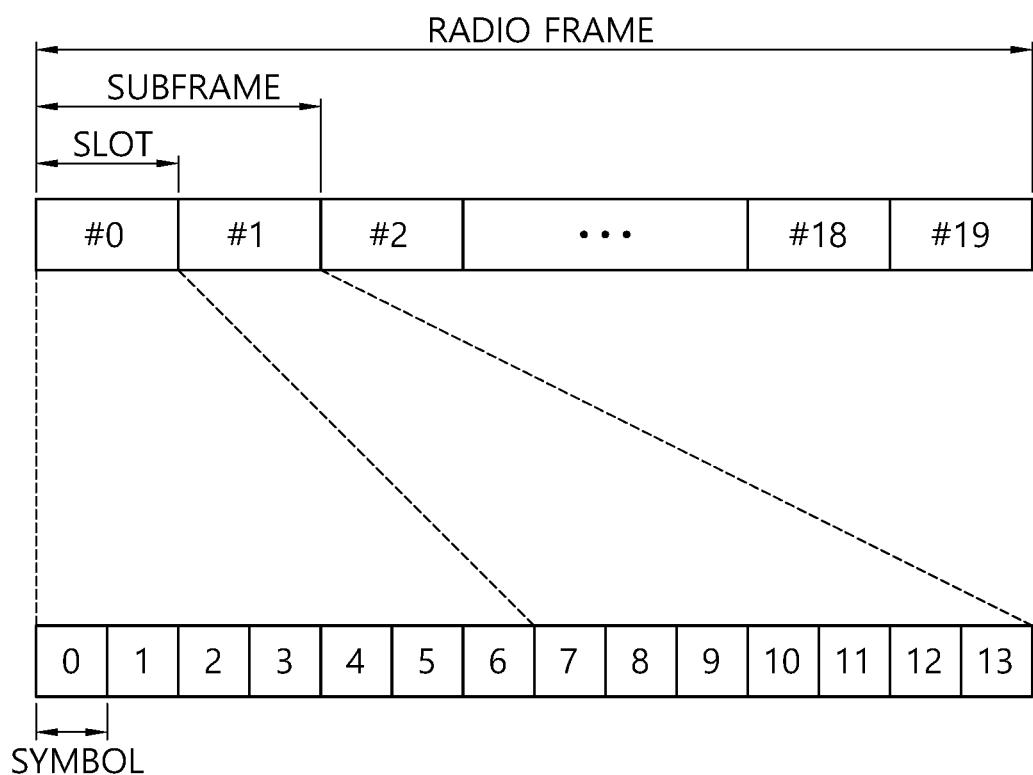
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Measurement and Measurement Report>

Supporting mobility of a UE 100 is essential in a mobile communication system. Thus, the UE 100 constantly measures a quality of a serving cell which is currently providing a service, and a quality of a neighbor cell. The UE 10 reports a result of the measurement to a network at an appropriate time, and the network provides optimal mobility to the UE through a handover or the like. Measurement for this purpose is referred to as a Radio Resource Management (RRM).

Meanwhile, the UE 100 monitors a downlink quality of a primary cell (Pcell) based on a CRS. This is so called Radio Link Monitoring (RLM).

FIG. 3 shows a procedure for cell detection and measurement.

Referring to FIG. 3, a UE detects a neighbor cell based on Synchronization Signal (SS) which is transmitted from the neighbor cell. The SS may include a Primary Synchronization Signal (PSS) and a Secondary Synchronization Signal (SSS).

When the serving cell 200a and the neighbor cell respectively transmit Cell-specific Reference Signals (CRSs), the UE 100 measures the CRSs and transmits a result of the measurement to the serving cell 200a. In this case, the UE 100 may compare power of the received CRSs based on received information on a reference signal power.

At this point, the UE 100 may perform the measurement in the following three ways.

1) RSRP (reference signal received power): This represents an average reception power of all REs that carry the CRS which is transmitted through the whole bands. In this case, instead of the CRS, an average reception power of all REs that carry the CSI RS may also be measured.

2) RSS (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a sub-band. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a radio resource configuration information element (IE) from the serving cell 100a for the measurement. The radio resource configuration information element (IE) is used to configure/modify/cancel a radio bearer or to modify an MAC configuration. The radio resource configuration IE includes subframe pattern information. The subframe pattern information is information on a measurement resource restriction pattern on the time domain, for measuring RSRP and RSRQ of a serving cell (e.g., PCell).

Meanwhile, the UE 100 receives a measurement configuration information element (IE) from the serving cell 100a for the measurement. A message including the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. A message including the measurement result is called a measurement report message.

The measurement configuration IE may include measurement object information. The measurement object information is information of an object which is to be measured by the UE. The measurement object includes at least one of an intra-frequency measurement object which is an object of intra-cell measurement, an inter-frequency measurement object which is an object of inter-cell measurement and an inter-RAT measurement object which is an object of inter-RAT measurement. For example, the intra-cell measurement object indicates a neighbor cell that has a frequency band which is identical to that of a serving cell, the inter-cell measurement object indicates a neighbor cell that has a frequency band which is different from that of a serving cell, and the inter-RAT measurement object indicates a neighbor cell of a RAT which is different from that of a serving cell.

TABLE 1

| Measurement object field description |
|---|
| carrierFreq |
| This indicates an E-UTRA carrier frequency to which this configuration is applied. |
| measCycleSCell |
| This indicates a cycle for measurement of a secondary cell (SCell) in a non-activated state. Its value may be set to 40, 160, 256, etc. If the value is 160, it indicates that measurement is performed every 160 subframes. |

Meanwhile, the measurement configuration IE includes an information element (IE) as shown in the following table.

TABLE 2

MeasConfig field description allowInterruptions
If its value is True, it indicates that interruption of transmission and reception with a serving cell is allowed when measurement of subcarriers of an Scell in a non-active state is performed using MeasCycleScell.
measGapConfig
It indicates configuration or cancelation of a measurement gap.

The "measGapConfig" is used to configure or cancel a measurement gap (MG). The MG is a period for cell identification and RSRP measurement on an inter frequency different from that of a serving cell.

TABLE 3

MeasGapConfig field description gapOffset
Any one of gp0 and gp1 may be set as a value of gapOffset. gp0 corresponds to a gapoffset of pattern ID "0" having MGRP = 40 ms. gp1 corresponds to a gapoffset of pattern ID "1" having MGRP = 80 ms.

TABLE 4

| Gap pattern Id | Measurement Gap Length (MGL) | Measurement Gap Repetition Period (MGRP) | Minimum available time for inter-frequency and inter-RAT measurements during 480 ms period |
|---|---|---|---|
| 0 | 6 ms | 40 ms | 60 ms |
| 1 | 6 ms | 80 ms | 30 ms |

When the UE requires a measurement gap to identify and measure a cell at an inter-frequency and inter-RAT, the E-UTRAN (i.e., the base station) may provide a single measurement gap (MG) pattern with a predetermined gap period to the UE. Without transmitting or receiving any data from the serving cell for the measurement gap period, the UE retunes its RF chain to be adapted to the inter-frequency and then performs measurement at the corresponding inter-frequency.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additonal radio resouce.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<Internet of Things (IoT) Communication>

Hereinafter, IoT will be described.

The IoT communication refers to the exchange of information between an IoT devices without human interaction through a base station or between the IoT device and a server through the base station. In this way, the IoT communication is also referred to as CIoT (Cellular Internet of Things) in that the IoT communication is performed through the cellular base station.

This IoT communication is a kind of machine type communication (MTC). Therefore, the IoT device may be referred to as an MTC device.

The IoT communication has a small amount of transmitted data. Further, uplink or downlink data transmission/reception rarely occurs. Accordingly, it is desirable to lower a price of the IoT device and reduce battery consumption in accordance with the low data rate. In addition, since the IoT device has low mobility, the IoT device has substantially the unchanged channel environment.

In one approach to a low cost of the IoT device, the IoT device may use, for example, a sub-band of approximately 1.4 MHz regardless of a system bandwidth of the cell.

The IoT communication operating on such a reduced bandwidth may be called NB (Narrow Band) IoT communication or NB CIoT communication.

<Next-Generation Mobile Communication Network>

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, for example, enhanced Mobile BroadBand (eMBB), massive Machine Type Communication (mMTC), and Ultra Reliable and Low Latency Communications (URLLC).

URLLC relates to a usage scenario in which high reliability and low delay time are required. For example, services like autonomous driving, automation, and virtual realities requires high reliability and low delay time (for example, 1 ms or less). A delay time of the current 4G (LTE) is statistically 21-43 ms (best 10%), 33-75 ms (median). Thus, the current 4G (LTE) is not sufficient to support a service requiring a delay time of 1 ms or less. Next, eMBB relates to a usage scenario in which an enhanced mobile broadband is required.

That is, the fifth-generation mobile communication system aims to achieve a capacity higher than the current 4G LTE and is capable of increasing a density of mobile broadband users and support Device-to-Device (D2D), high stability, and Machine Type Communication (MTC). Researches on 5G aims to achieve reduced waiting time and less batter consumption, compared to a 4G mobile communication system, in order to implement the IoT. For the 5G mobile communication, a new radio access technology (New RAT or NR) may be proposed.

Figure 4A:
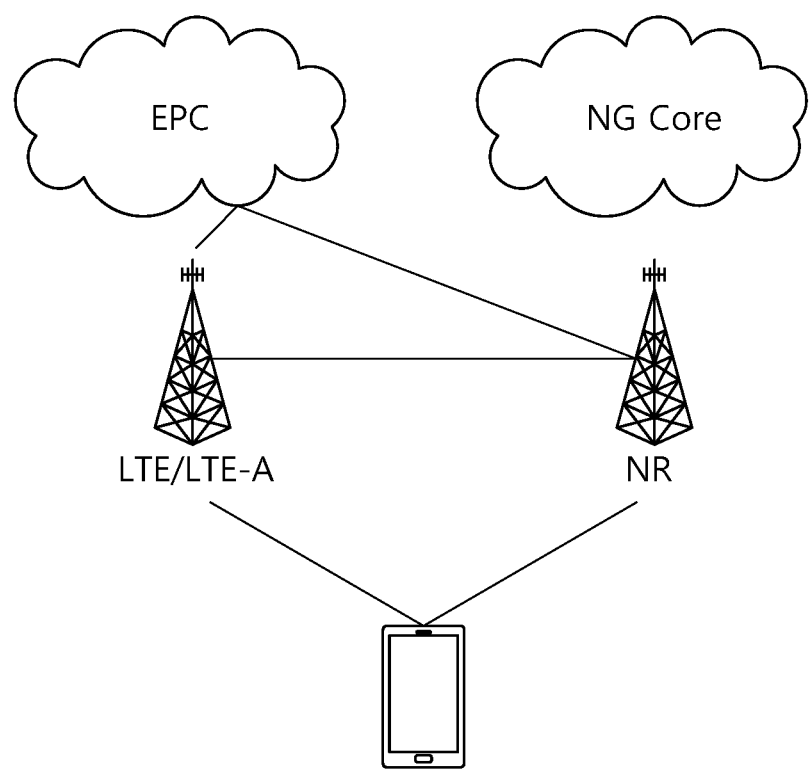
FIGS. 4A to 4C are diagrams illustrating exemplary architecture for a service of the next-generation mobile communication.
Figure 4B:
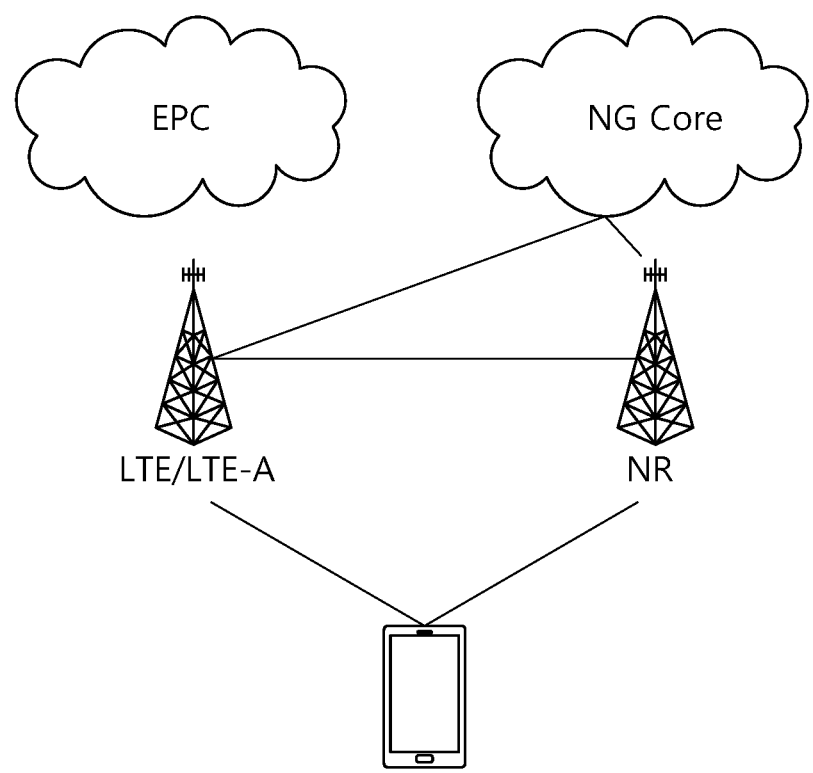
Figure 4C:
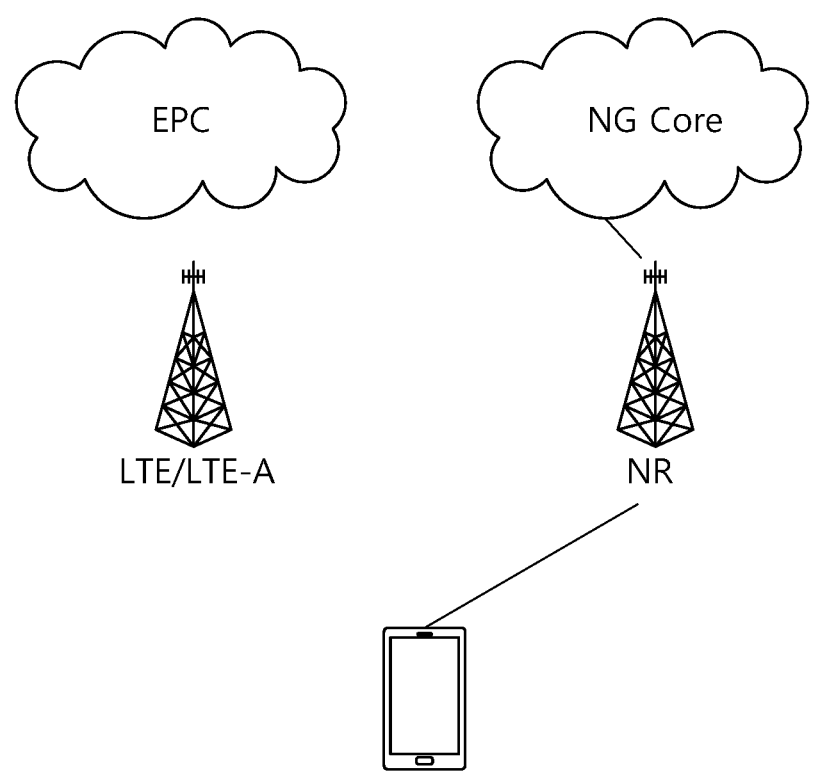

FIGS. 4A to 4C are Diagrams Illustrating Exemplary Architecture for a Next-Generation Mobile Communication Service.

Referring to FIG. 4A, a UE is connected in dual connectivity (DC) with an LTE/LTE-A cell and a NR cell.

The NR cell is connected with a core network for the legacy fourth-generation mobile communication, that is, an Evolved Packet core (EPC).

Referring to FIG. 4B, the LTE/LTE-A cell is connected with a core network for 5th generation mobile communication, that is, a Next Generation (NG) core network, unlike the example in FIG. 4A.

A service based on the architecture shown in FIGS. 4A and 4B is referred to as a non-standalone (NSA) service.

Referring to FIG. 4, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

Figure 5:
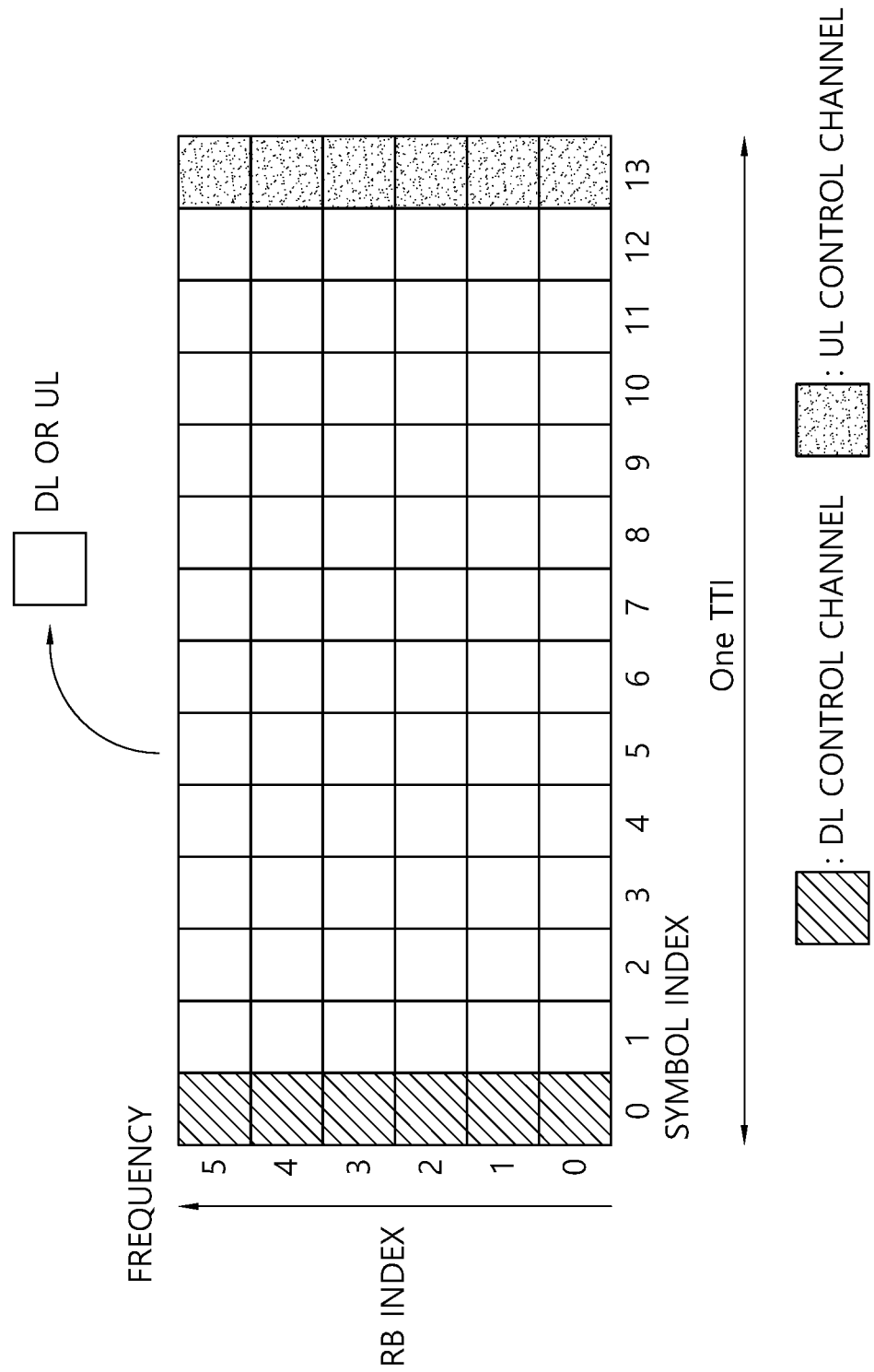
FIG. 5 illustrates an example of a subframe type in NR.

FIG. 5 Shows an Example of Subframe Type in NR.

A transmission time interval (TTI) shown in FIG. 5 may be called a subframe or slot for NR (or new RAT). The subframe (or slot) in FIG. 5 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission.

According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

TABLE 5

| $\mu$ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by $\mu$, the number of OLDM symbols per slot $N^{slot}_{symb}$, the number of slots per frame Nframe,$\mu$slot, and the number of slots per subframe Nsubframe,$\mu$slot are expressed as shown in the following table.

TABLE 6

| $\mu$ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by $\mu$, the number of OLDM symbols per slot $N^{slot}_{symb}$, the number of slots per frame Nframe,$\mu$slot, and the number of slots per subframe Nsubframe,$\mu$slot are expressed as shown in the following table.

TABLE 7

| $\mu$ | $N^{slot}_{symb}$ | $N^{frame, \mu}_{slot}$ | $N^{subframe, \mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 8

| For-mat | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | U | U | U | U | U | U | U |
| 46 | D | D | D | D | D | X | D | D | D | D | D | D | D | X |
| 47 | D | D | D | D | X | X | D | D | D | D | D | X | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | U | U |
| 55 | D | D | X | U | U | U | D | X | U | U | U | U | U | U |
| 56 | D | X | U | U | U | U | D | X | U | U | U | U | U | U |
| 57 | D | D | D | X | U | U | D | D | D | X | X | U | U | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | U | U | U |
| 61 | D | D | X | X | X | U | D | D | X | X | X | U | U | U |

<Operating Band in NR>

An operating band in NR is as follows.

An operating band shown in Table 9 is a reframing operating band that is transitioned from an operating band of LTE/LTE-A. This operating band is referred to as FR1 band.

TABLE 9

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The following table shows an NR operating band defined at high frequencies. This operating band is referred to as FR2 band.

TABLE 10

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |

Meanwhile, when the operating band shown in the above table is used, a channel bandwidth is used as shown in the following table.

TABLE 11

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS indicates a subcarrier spacing. In the above table, NRB indicates the number of RBs.

Meanwhile, when the operating band shown in the above table is used, a channel bandwidth is used as shown in the following table.

TABLE 12

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an SS block. In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

Figure 6:
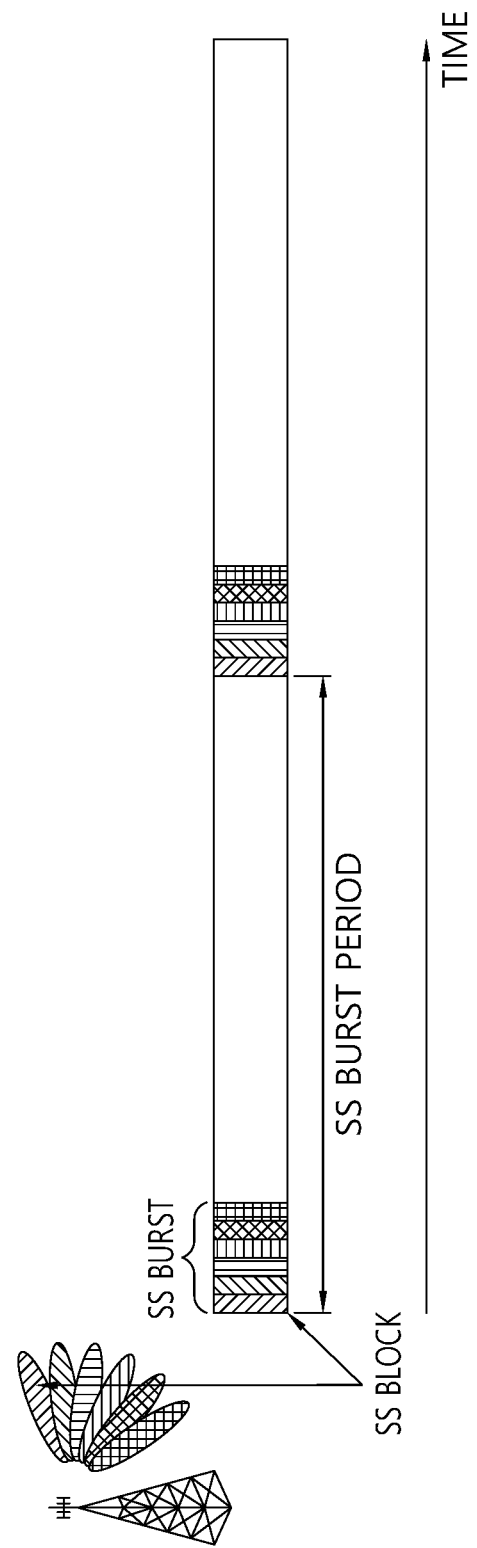
FIG. 6 illustrates an example of an SS block in NR.

FIG. 6 is a Diagram Illustrating an Example of an SS Block in NR.

Referring to FIG. 6, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 7.

Figure 7:
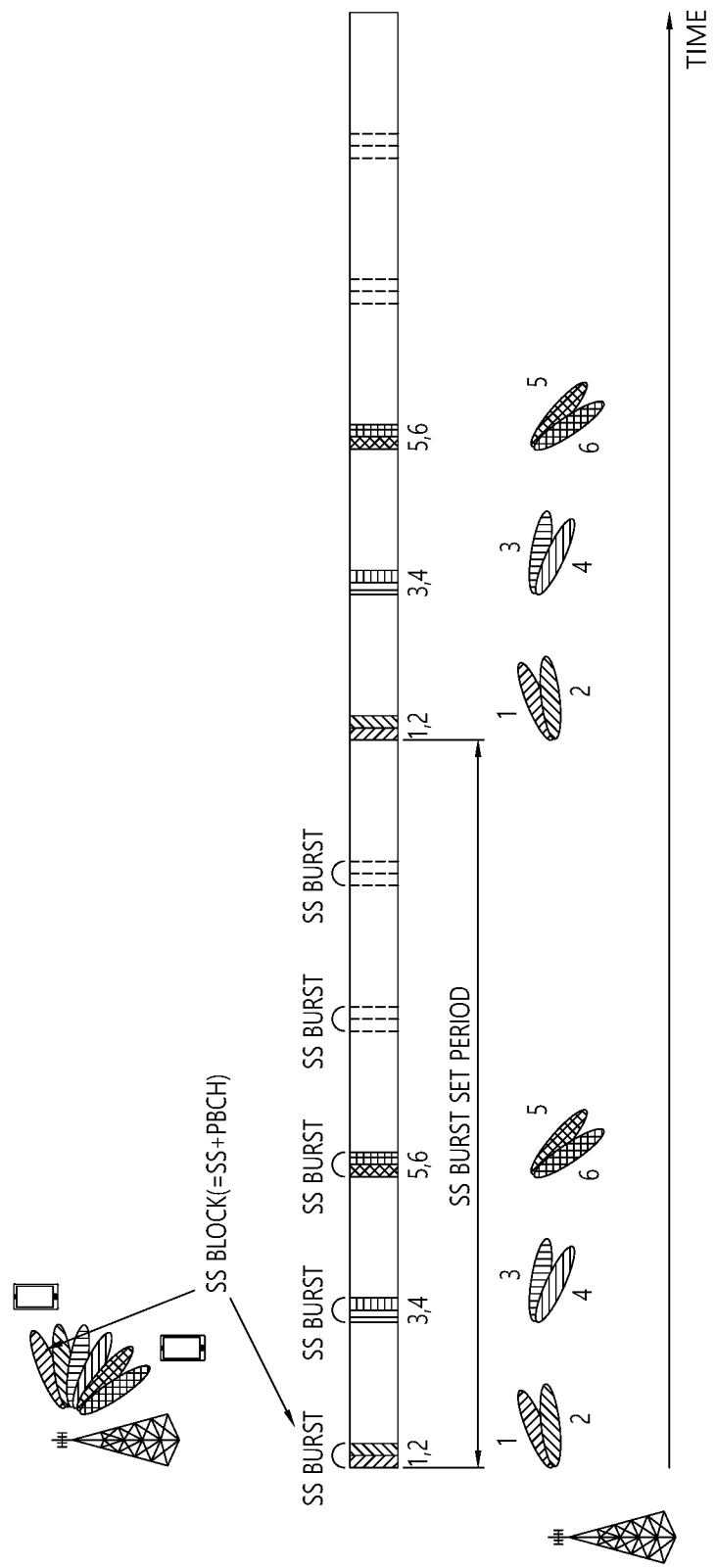
FIG. 7 illustrates an example of beam sweeping in NR.

FIG. 7 is a Diagram Illustrating an Example of Beam Sweeping in the NR.

A base station transmits each SS block in an SS burst over time while performing beam sweeping. In this case, multiple SS blocks in an SS burst set are transmitted to support UEs existing in different directions. In FIG. 6, the SS burst set includes one to six SS blocks, and each SS burst includes two SS blocks.

<Channel Raster and Sync Raster>

Hereinafter, a channel raster and a sync rater will be described.

A frequency channel raster is defined as a set of RF reference frequencies (FREF). An RF reference frequency may be used as a signal indicative of locations of an RF channel, an SS block, and the like.

A global frequency raster may be defined with respect to all frequencies from 0 GHz to 100 GHz. The granularity of the global frequency raster may be expressed by ΔFGlobal.

An RF reference frequency is designated by NR Absolute Radio Frequency Channel Number (NR-AFRCN) in the global frequency raster's range (0 . . . 2016666). A relationship between the NR-AFRCN and the RF reference frequency (FREF) of MHz may be expressed as shown in the following equation. Here, FREF-Offs and NRef-Offs are expressed as shown in the following Table.

$$FREF = FREF\text{-Offs} + \Delta F Global\ (NREF - NREF\text{-Offs}) \quad \text{[Equation 1]}$$

TABLE 13

| Frequency Range (MHz) | $\Delta F_{Global}$ (kHz) | $F_{REF\text{-}Offs}$ (MHz) | $N_{REF\text{-}Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

A channel raster indicates a subset of FR reference frequencies able to be used to identify location of an RF channel in uplink and downlink. An RF reference frequency for an RF channel may be mapped to a resource element on a subcarrier.

Mapping of the RF reference frequency of the channel raster and the corresponding resource element may be used to identify a location of an RF channel. The mapping may differ according to a total number of RBs allocated to the channel, and the mapping applies to both uplink (UL) and downlink (DL).

When NRB mod 2=0,
the RE index k is 0, and
the number of PRBs is as below.

$$n_{PRB} = \left\lfloor \frac{N_{RB}}{2} \right\rfloor$$

When NRB mod 2=0,
the RE index k is 6,
the number of PRBs is as below.

$$n_{PRB} = \left\lfloor \frac{N_{RB}}{2} \right\rfloor$$

Locations of RF channels of a channel raster in each NR operating band may be expressed as shown in the following table.

TABLE 14

| NR Operating Band | $\Delta F_{Raster}$ (kHz) | Uplink Frequency Range of $N_{REF}$ (First-<Step size>-Last) | Uplink Frequency Range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |

TABLE 14-continued

| NR Operating Band | $\Delta F_{Raster}$ (kHz) | Uplink Frequency Range of $N_{REF}$ (First-<Step size>-Last) | Uplink Frequency Range of $N_{REF}$ (First-<Step size>-Last) |
|---|---|---|---|
| n25 | 100 | 370000-<20>-383000 | 386000-<20>-399000 |
| n28 | 100 | 140600-<20>-149600 | 151600-<20>-160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
|  | 30 | 499200-<6>-537996 | 499200-<6>-537996 |
| n51 | 100 | 285400-<20>-286400 | 285400-<20>-286400 |
| n66 | 100 | 342000-<20>-356000 | 422000-<20>-440000 |
| n70 | 100 | 339000-<20>-342000 | 399000-<20>-404000 |
| n71 | 100 | 132600-<20>-139600 | 123400-<20>-130400 |
| n75 | 100 | N/A | 286400-<20>-303400 |
| n76 | 100 | N/A | 285400-<20>-286400 |
| n77 | 15 | 620000-<1>-680000 | 620000-<1>-680000 |
|  | 30 | 620000-<2>-680000 | 620000-<2>-680000 |
| n78 | 15 | 620000-<1>-653333 | 620000-<1>-653333 |
|  | 30 | 620000-<2>-653332 | 620000-<2>-653332 |
| n79 | 15 | 693334-<1>-733333 | 693334-<1>-733333 |
|  | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

TABLE 15

| NR Operating Band | $\Delta F_{Raster}$ (kHz) | Uplink and Downlink Frequency Range (First-<Step size>-Last) |
|---|---|---|
| n257 | 60 | 2054166-<1>-2104165 |
|  | 120 | 2054167-<2>-2104165 |
| n258 | 60 | 2016667-<1>-2070832 |
|  | 120 | 2016667-<2>-2070831 |
| n260 | 60 | 2229166-<1>-2279165 |
|  | 120 | 2229167-<2>-2279165 |
| n261 | 60 | 2070833-<1>-2084999 |
|  | 120 | 2070833-<2>-2087497 |

Meanwhile, a sync raster indicates a frequency location of an SS block used by a UE to acquire system information. The frequency location of the SS block may be defined as SSREF using a GSCN number corresponding thereto FIG. 8 Shows an Example of Performing Measurement in EN(E-UTRAN and NR) DC Case.

Figure 8:
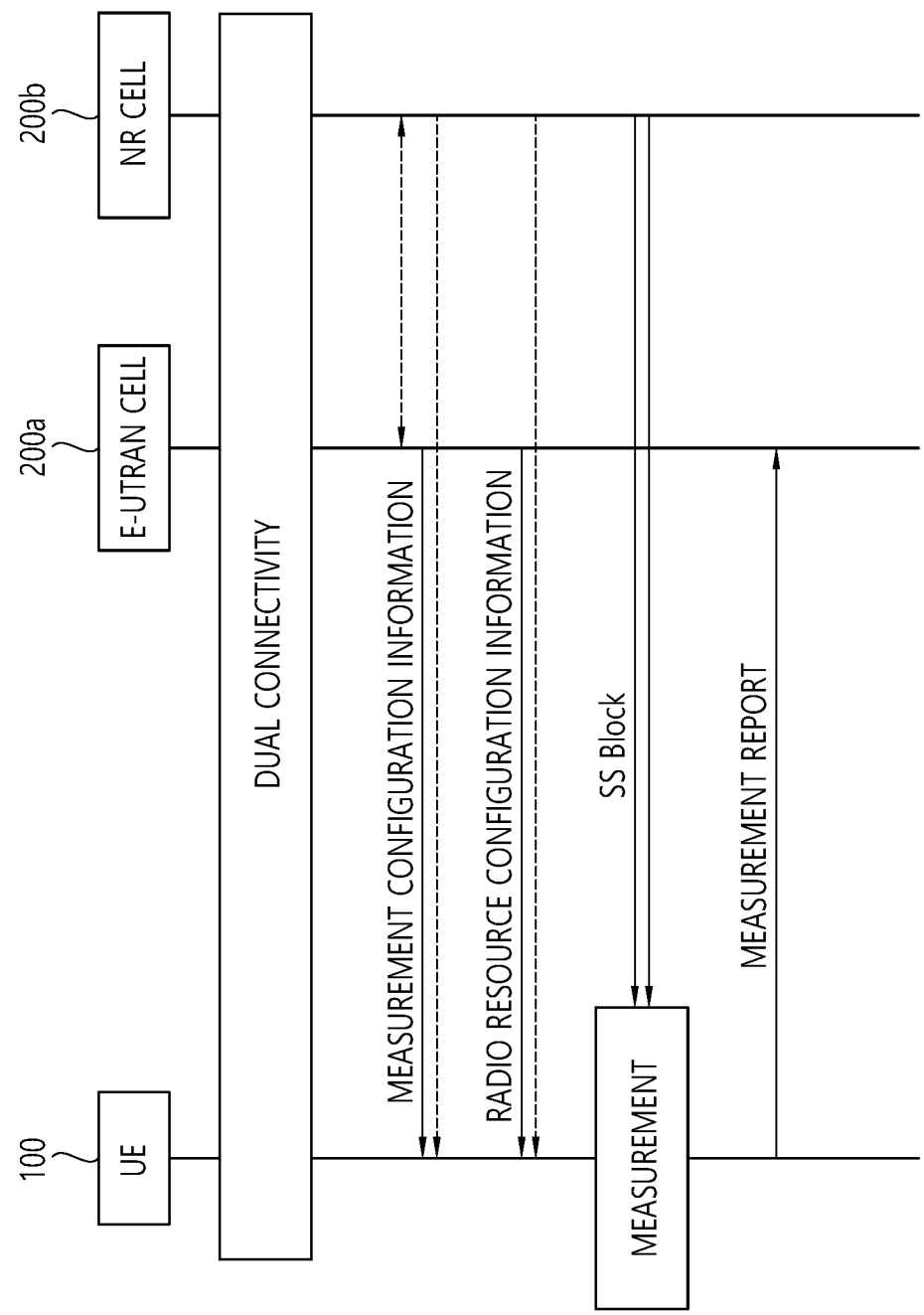
FIG. 8 illustrates an example of performing measurement in an EN (E-UTRAN and NR)-DC case.

Referring to FIG. 8, the UE 100 are connected in EN-DC with an E-UTRAN (that is, LTE/LTE-A) cell. Here, a Pcell in EN-DC may be an E-UTRAN (that is, LTE/LTE-A) cell, and a PSCell in EN-DC may be an NR cell.

The UE 100 may receive measurement configuration (or "measconfig") information element (IE) of the E-UTRAN (that is, LTE/LTE-A) cell. The measurement configuration (or "measconfig") IE received from the E-UTRAN (that is, LTE/LTE-A) cell may further include fields shown in the following table, in addition to the fields shown in Table 2.

TABLE 16

| MeasConfig field description |
|---|
| fr1-Gap<br>This field exists when a UE is configured with EN-DC. This field indicates whether a gap is applied to perform measurement on FR1 band (that is, a band shown in Table 9). |

TABLE 16-continued

| MeasConfig field description |
|---|
| mgta<br>It indicates whether to apply a timing advance (TA) of 0.5 ms for a measurement gap configuration provided by the E-UTRAN. |

The measurement configuration (or "measconfig") IE may further include a measGapConfig field for setting a measurement gap (MG), as shown in Table 2.

A gapoffset field within the measGapConfig field may further include gp4, gp5, . . . , gp11 for EN-DC, in addition to the example shown in Table 3.

Meanwhile, the UE 100 may receive a measurement configuration ("measconfig") IE of an NR cell, which is a PSCell, directly from the NR cell or through the E-UTRAN cell which is a Pcell.

Meanwhile, the measurement configuration ("measconfig") IE of the NR cell may include fields as shown in the following table.

TABLE 17

| MeasConfig field description |
|---|
| measGapConfig<br>It indicates configuration or cancelation of a measurement gap<br>s-MeasureConfig<br>It indicates a threshold value for measurement of NR SpCell RSRP when a<br>UE needs to perform measurement on a non-serving cell. |

The above measGapConfig may further include fields as shown in the following table.

TABLE 18

| MeasGapConfig field description |
|---|
| gapFR2<br>It indicates a measurement gap configuration applicable for FR2 frequency range.<br>gapOffset<br>It indicates a gap offset of a gap pattern with an MGRP.<br>mgl<br>It indicates a measurement gap length by ms. There may be 3 ms, 4 ms, 6 ms, etc.<br>mgrp<br>It indicates a measurement gap repetition period by ms.<br>mgta<br>It indicates whether to apply a timing advance (TA) of 0.5 ms for a measurement gap configuration. |

Meanwhile, as shown in the drawing, the UE 100 receives a radio resource configuration information element (IE) of the E-UTRAN (that is, LTE/LTE-A) cell which is a Pcell. In addition, the UE may receive a radio resource configuration IE of an NR cell, which is a PSCell, from the NR cell or through the E-UTRAN cell which is a Pcell. The radio resource configuration IE includes subframe pattern information, as described above with reference to FIG. 3.

The UE 100 performs measurement and reports a measurement result. Specifically, the UE 100 interrupts data transmission and reception with the E-UTRAN (that is, LTE/LTE-A) cell during the measurement gap, retunes its own RF chain, and performs measurement based on receipt of an SS block from an NR cell.

<Disclosure of the Present Specification>

Hereinafter, there is proposed a method for, when measurement is performed during a measurement gap, accurately calculating a time period in which transmission and reception of data are interrupted and restricting scheduling of a base station for the calculated time period.

EN-DC may support both a synchronous method and an asynchronous method. Synchronous EN-DC may be used for intra-band TDD-TDD (Pcell-PSCell) EN-DC, intra-band FDD-FDD (Pcell-Pscell), and inter-band FDD-FDD (Pcell-Pscell), and also for inter-band TDD-TDD (Pcell-Pscell) and inter-band TDD-FDD (Pcell-Pscell or Pcell-Pscell). Asynchronous EN-DC may be used for inter-band TDD-TDD (Pcell-PSCell) EN-DC, inter-band TDD-FDD (Pcell-PSCell or PSCell-Pcell) EN-DC, inter-band FDD-FDD (Pcell-PSCell) EN-DC, and intra-band FDD-FDD (Pcell-PSCell) EN-DC.

A Maximum Receiving Time difference (MRTD) regarding asynchronous EN-DC may be summarized as shown in the following table. SCSSS indicates a subcarrier spacing (SCS) of a synchronous signal (SS), and SCSDATA indicates a subcarrier spacing (SCS) of data.

TABLE 19

| SCS in PCell (that is, LTE/ LTE-A cell) (kHz) | SCS in PSCell (that is, NR cell) (kHz) (see, Note) | MRTD(Maximum receive timing difference) (µs) |
| --- | --- | --- |
| 15 | 15 | 500 |
| 15 | 30 | 250 |
| 15 | 60 | 125 |
| 15 | 120 | 62.5 |

Note:
A downlink SCS is determined by min{$SCS_{SS}$, $SCS_{DATA}$}. 120 kHz is not supported with respect to intra-band FDD-FDD LTE-NR DC.

The present specification proposes the following for synchronous EN-DC.

Two candidates may be considered as MRTD values for intra-band TDD-TDD (Pcell-PSCell) EN-DC. The first candidate is a value determined based on a CP length related to a subcarrier spacing. The second candidate is a value determined based on time alignment of a base station. A requirement related to cell phase synchronization accuracy for TDD may be better by about 3 us or more compared to an antenna connector of the base station. Here, the cell phase synchronization accuracy for TDD is defined as the maximum absolute deviation between frame start timings for a pair of cells whose coverage areas overlap at the same frequency.

Thus, this can be summarized as below.

Summary 1: A requirement for cell phase synchronization accuracy for NR TDD may be defined regardless of an NR SCS.

Meanwhile, in the Rel-15 NR, an NR cell may be arranged with an LTE/LTE-A cell. Thus, unlike in LTE DC, it may not necessary to consider a difference in propagation delay. For example, in the case of inter-band synchronous LTE DC, the MTRD is set to 33 us (30 us+3 us) by considering propagation delay between a PCG cell and an SCG cell as 30 us. Here, a time difference of 3 us between synchronous TDD BSs is considered. It is regardless of an SCS.

Thus, this may be summarized as below.

Summary 2: A requirement for cell phase synchronization accuracy for NR TDD may be defined without consideration of an NR SCS.

Based on the above two summaries, a MRTD requirement for synchronous TDD-TDD LTE-NR DC may be defined regardless of an NR SCS.

Thus, the present specification suggests the following.

Suggestion 1: an MRTD requirement for synchronous TDD-TDD LTE-NR DC may be defined as 3 us, as shown in the following table, regardless of an NR subcarrier spacing.

TABLE 20

| SCS in PCell (that is, LTE/ LTE-A cell) (kHz) | SCS in PSCell (that is, NR cell) (kHz) (see, Note) | MRTD(Maximum receive timing difference) (µs) |
| --- | --- | --- |
| 15 | 15 | 3 |
| 15 | 30 | 3 |
| 15 | 60 | 3 |

Note:
A downlink SCS is determined by min{$SCS_{SS}$, $SCS_{DATA}$}.

Based on the above MRTD, a total time period of transmission and reception interruption caused in an SCG due to a measurement gap of a Master cell group (MCG) in EN-DC may be suggested as below.

First, there may be a plurality of MGLs. In addition, MGLs for synchronous and asynchronous EN-DC may be defined as below.

In the case where a UE supports a single measurement gap, three MGLs of 6 ms, 4 ms, and 3 ms, may be used.

In the case where a measurement gap is supported for FR1/FR2 independently, the following MGLs may be used.

In the case of FR1: Three MGLs of 6 ms, 4 ms, and 3 ms may be used.

In the case where only a FR1/LTE serving cell is used: Three MGLs of 6 ms, 4 ms, and 3 ms may be used.

In the case where the same measurement gap is set for FR1 and FR2: Three MGLs of 6 ms, 4 ms, and 3 ms may be used.

In the case where a measurement gap is supported for FR1/FR2 independently, [1+x] ms, [2.25+x] ms, [5+x] ms may be used.

An MRTD may differ depending on a downlink SCS of asynchronous E-UTRA-NR DC. When mixed numerologies are applied in downlink, an MRTD needs to be defined between an SCS of an SBB and an SCS of data with reference to a minimum SCS, as shown in the following table.

The following table shows MRTDs for asynchronization.

TABLE 21

| SCS in PCell (that is, LTE/ LTE-A cell) (kHz) | SCS in PSCell (that is, NR cell) (kHz) (see, Note) | MRTD (Maximum receive timing difference) (µs) |
| --- | --- | --- |
| 15 | 15 | 500 |
| 15 | 30 | 250 |
| 15 | 60 | 125 |
| 15 | 120 | 62.5 |

Note:
A downlink SCS is determined by min{$SCS_{SS}$, $SCS_{DATA}$}. 120 kHz is not supported for intra-band FDD-FDD LTE-NR DC.

For synchronous EN-DC (TDD-TDD), an NR cell may be arranged with an LTE/LTE-A cell. In this case, an MRTD may be suggested as shown in the following Table 22. That is, the same MRTD (that is, 3 us) may be set for different SCSs.

The following table shows MRTD for synchronization.

TABLE 22

| SCS in PCell (that is, LTE/ LTE-A cell) (kHz) | SCS in PSCell (that is, NR cell) (kHz) (see, Note) | MRTD(Maximum receive timing difference) (µs) |
|---|---|---|
| 15 | 15 | 3 |
| 15 | 30 | 3 |
| 15 | 60 | 3 |

Footnote:
A downlink SCS is determined by $\min\{SCS_{SS}, SCS_{DATA}\}$.

Based on the MRTDs defined in the above tables, it is necessary to define a total time period of transmission and reception interruption for synchronous EN-DC and asynchronous EN-DC individually.

In the case of E-UTRA DC, a total time period in which transmission and reception is interrupted on an SCG is defined as the number of subframes. However, in the case of EN-DC, a basic time unit for transmission and reception in NR is a slot, and thus, a total time period in which transmission and reception are interrupted should be defined on a slot basis. As shown in the following table, the number of slots for 1 ms may differ depending on a NR SCS.

TABLE 23

| SCS in PSCell (that is, NR cell) (kHz) | Number of Slots for 1 ms | CP length (µs) |
|---|---|---|
| 15 | 1 | 4.69 |
| 30 | 2 | 2.35 |
| 60 | 4 | 1.17 |
| 120 | 8 | 0.59 |

In order to calculate a total time period of transmission and reception interruption, a CP length may be compared with an MRTD.

Figure 9:
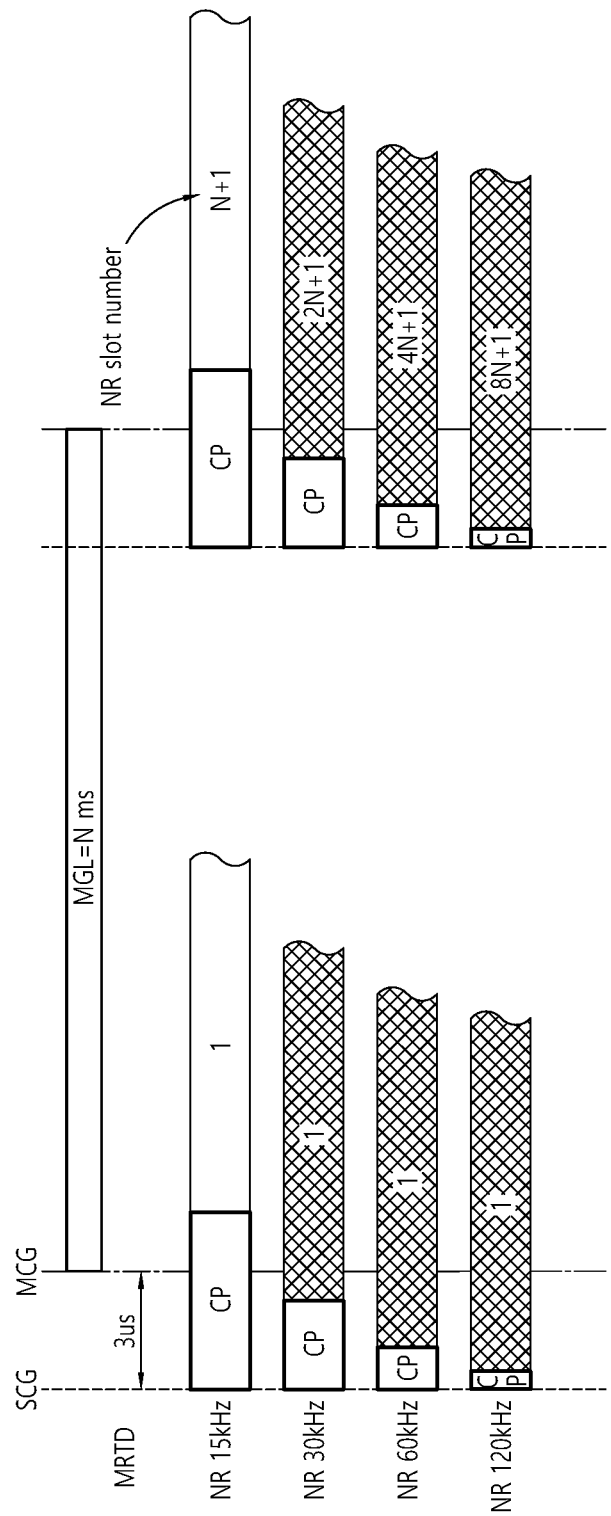
FIG. 9 is a diagram illustrating examples of a total time period in which transmission and reception are interrupted during an MGL in a synchronous EN-DC case according to various numerologies.

FIG. 9 is a Diagram Illustrating Examples of a Total Time Period of Transmission and Reception Interruption During an MGL in Synchronous EN-DC Case According to Various Numerologies.

As illustrated in the drawing, in the case where an MGL is set to an integer N, a total time period in which transmission and reception is interrupted on an SCG may be determined based on a SCG as below. The value of N may be one of 6 ms, 4 ms, and 3 ms.

a. In the case of synchronous EN-DC (that is, TDD-TDD intra-band EN-DC, a total time period in which transmission and reception are interrupted on an SCG during an MGL may be expressed using N, as below.

when NR subcarrier spacing (SCS)=15 kHz, it may be N number of slots.

when NR subcarrier spacing (SCS)=30 kHz, it may be 2N+1 number of slots.

when NR subcarrier spacing (SCS)=60 kHz, it may be 4N+1 number of slots.

b. In the case of asynchronous EN-DC, the MRTD in Tables 21 and 22 is always longer than a CP length. Accordingly, a total time period in which transmission and reception are interrupted on an SCG may be as below.

In the case of asynchronous EN-DC, a total time period in which transmission and reception are interrupted on an SCG during an MGL may be expressed using N, as below.

when NR subcarrier spacing (SCS)=15 kHz, it may be N+1 number of slots.

when NR subcarrier spacing (SCS)=30 kHz, it may be 2N+1 number of slots.

when NR subcarrier spacing (SCS)=60 kHz, it may be 4N+1 number of slots.

when NR subcarrier spacing (SCS)=120 kHz, it may be 8N+1 number of slots.

Meanwhile, a non-integer MGL may be used. For example, a serving cell operates as FR2, and a cell subject to measurement operates as FR2, a non-integer MGL such as [5+x] ms, [2.25+x] ms, and [1+x] ms may be used. The non-integer MGL may be set by a serving cell SCG. This may mean that transmission and reception interruption on an SCG is not going to occur. For this reason, a total time period of transmission and reception interruption by the non-integer MGL does not need to be considered in EN-DC case.

Based on the forgoing description, a total time period in which transmission and reception are interrupted on an SCG may be summarized as shown in the following table.

TABLE 24

| SCS in PSCell (that is, NR cell) (kHz) | Total Time of Transmission and Reception Interruption on SCG during MGL (Slots) MGL(ms) | | | | | | | | | | |
|---|---|---|---|---|---|---|---|---|---|---|---|
| | Synchronous EN-DC | | | | | | Asynchronous EN-DC | | | | | |
| | 6 | [4] | 3 | [5 + x] | [2.25 + x] | [1 + x] | 6 | [4] | 3 | [5 + x] | [2.25 + x] | [1 + x] |
| 15 | 6 | 4 | 3 | N/A | N/A | N/A | 7 | 5 | 4 | N/A | N/A | N/A |
| 30 | 13 | 9 | 7 | N/A | N/A | N/A | 13 | 9 | 7 | N/A | N/A | N/A |
| 60 | 25 | 17 | 13 | N/A | N/A | N/A | 25 | 17 | 13 | N/A | N/A | N/A |
| 120 | N/A | N/A | N/A | N/A | N/A | N/A | 49 | 33 | 25 | N/A | N/A | N/A |

In the above table, N/A stands for Not Applicable.

Based on the above table, the present specification suggests defining a measurement gap as below.

In the case of EN-DC, a total time period in which transmission and reception are interrupted on an SCG during an MGL may be defined only when MGL (N) is 6 ms, 4 ms, and 3 ms. A total interruption time period for an SCG in synchronous EN0DC is summarized in the following Table 25. In addition, a total interruption time period for an SCG in asynchronous EN0DC is summarized in the following Table 26.

The following table shows a total time period in which transmission and reception are interrupted on an SCG during an MGL in synchronous EN-DC case.

TABLE 25

| SCS in PCell (that is, LTE/LTE-A cell) (kHz) | DL SCS in PSCell(that is, NR cell) (kHz) (see, Note) | Total time in which transmission and reception are interrupted on SCG during MGL (Slots) | | |
|---|---|---|---|---|
| | | MGL = 6 ms | MGL = 4 ms | MGL = 3 ms |
| 15 | 15 | 6 | 4 | 3 |
| 15 | 30 | 13 | 9 | 7 |
| 15 | 60 | 25 | 17 | 13 |

Note:
A downlink SCS is determined by min{$SCS_{SS}$, $SCS_{DATA}$}

The following table shows a total time period in which transmission and reception are interrupted on an SCG during an MGL in asynchronous EN-DC case.

TABLE 26

| SCS in PCell (that is, LTE/LTE-A cell) (kHz) | DL SCS in PSCell (that is, NR cell) (kHz) (see, Note) | Total time in which transmission and reception are interrupted on SCG during MGL (Slots) | | |
|---|---|---|---|---|
| | | MGL = 6 ms | MGL = 4 ms | MGL = 3 ms |
| 15 | 15 | 7 | 5 | 4 |
| 15 | 30 | 13 | 9 | 7 |
| 15 | 60 | 25 | 17 | 13 |
| 15 | 120 | 49 | 33 | 25 |

Note:
A downlink SCS is determined by min{$SCS_{SS}$, $SCS_{DATA}$}

Figure 10A:
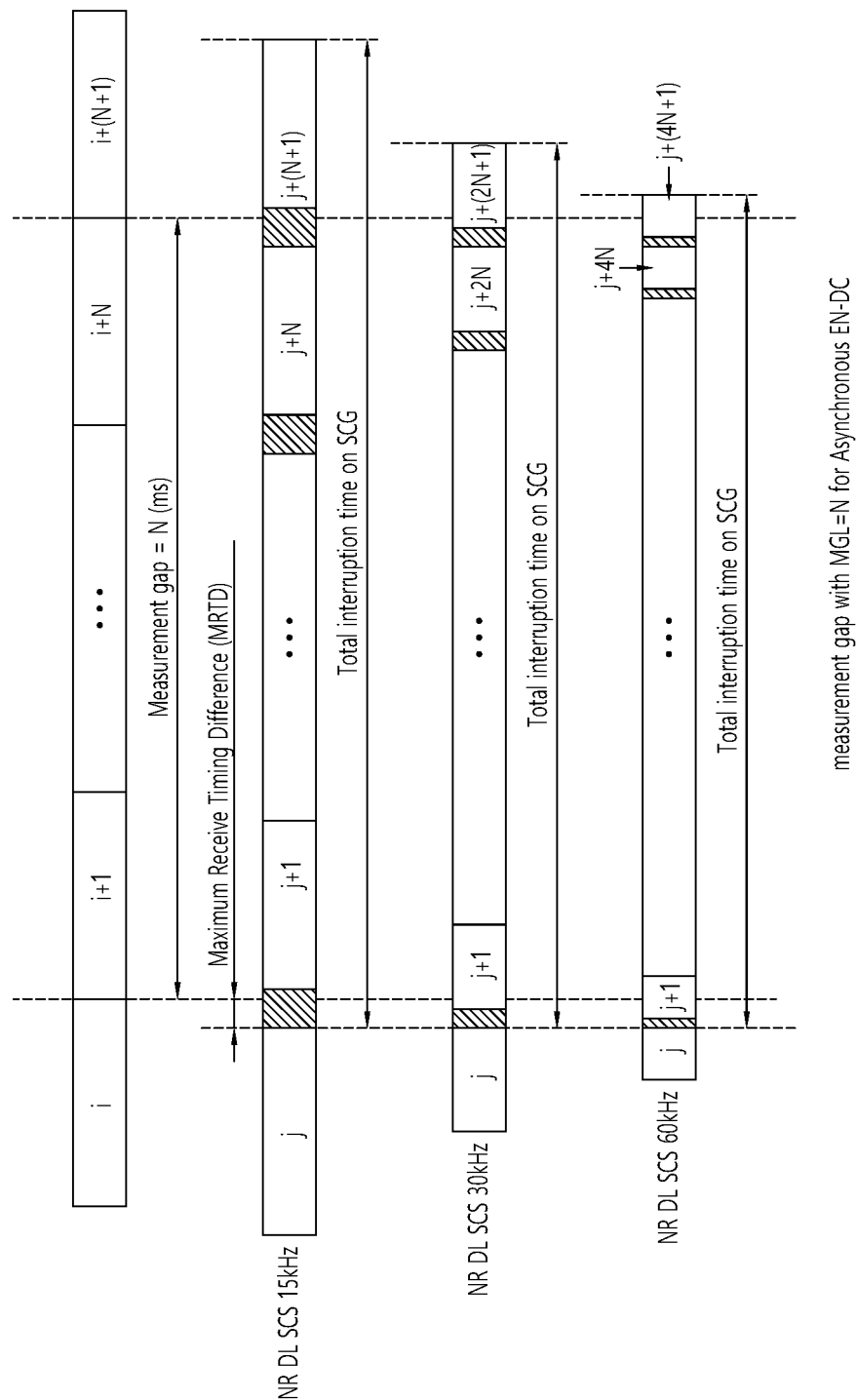
FIGS. 10A and 10B are diagrams illustrating examples of a total time period in which transmission and reception are interrupted during an MGL in EN-DC.
Figure 10B:
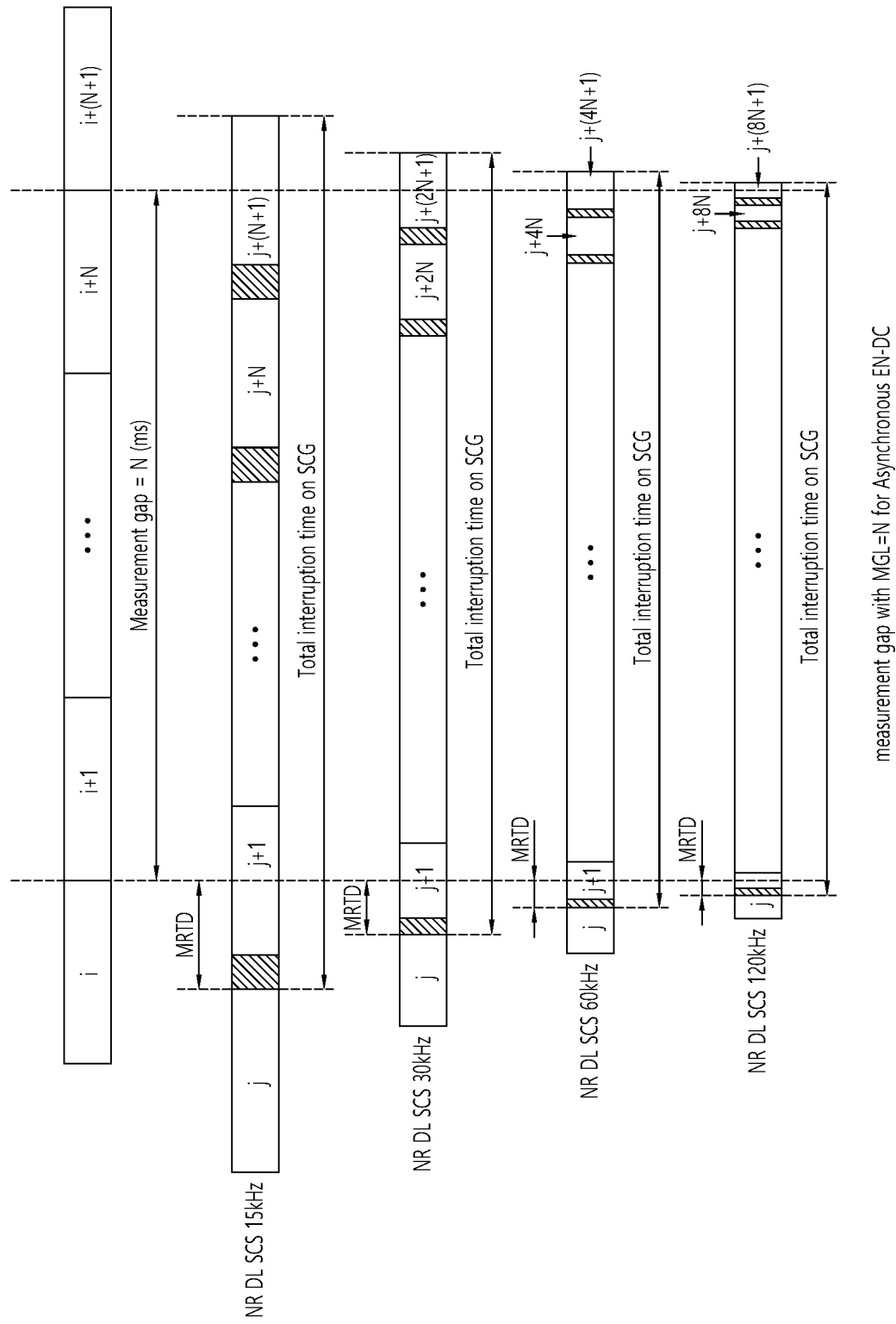

FIGS. 10A and 10B are Diagram Illustrating Examples of a Total Time Period, in which Transmission and Reception are Interrupted During an MGL in EN-DC According to Various Numerologies.

In the case of synchronous EN-DC, as shown in FIG. 10A, SCG slots of j+1 to J+N, SCG slots of j+1 to j+(2N+1), slots of j+1 to j+(4N+1), and MCG subframes of i+1 to i+N may be included in a total interruption period with respect to respective downlink subcarrier spacings (SCS) of, 15 kHz, 30 kHz, and 60 kHz In the case of asynchronous EN-DC, as shown in FIG. 10B, SCG slots of j+1 to J+(N+1), SCG slots of j+1 to j+(2N+1), slots of j+1 to j+(4N+1), SCG slots of j+1 to j+(8N+1), and MCG subframes of i+1 to i+N may be included in a total interruption period with respect to respective downlink subcarrier spacings (SCS) of, 15 kHz, 30 kHz, 60 kHz, and 120 kHz.

Figure 11:
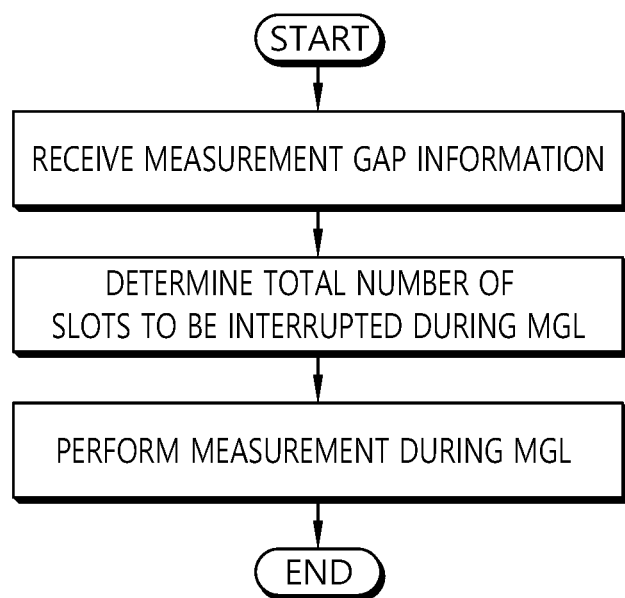
FIG. 11 is a flowchart illustrating operations of a UE according to a disclosure of this specification.

FIG. 11 is a Flowchart Illustrating Operations of a UE According to a Disclosure of the Present Specification.

A UE may receive measurement gap configuration information. The measurement gap configuration information may be included in a measurement configuration ("measconfig") IE to be received by the UE, as described above with reference to FIG. 8. The measurement configuration IE may include a measurement configuration IE of an E-UTRA cell and a measurement configuration IE of an NR cell, as described above with reference to FIG. 8. The measurement configuration IE of the NR cell may be received directly from the NR cell or through the E-UTRA cell.

The measurement gap configuration information may include a measurement gap length (MGL). The MGL may include one of 3 ms, 4 ms, and 6 ms.

The UE may determine a total number of slots to be interrupted during the MGL, and perform measurement during the MGL.

The total number of slots to be interrupted may be determined based on an SCS of an NR cell and the MGL.

The above-described embodiments of the present invention may be implemented by use of various means. For example, the embodiments of the present invention may be implemented by hardware, firmware, and software or a combination thereof. A detailed description thereof will be provided with reference to drawings.

Figure 12:
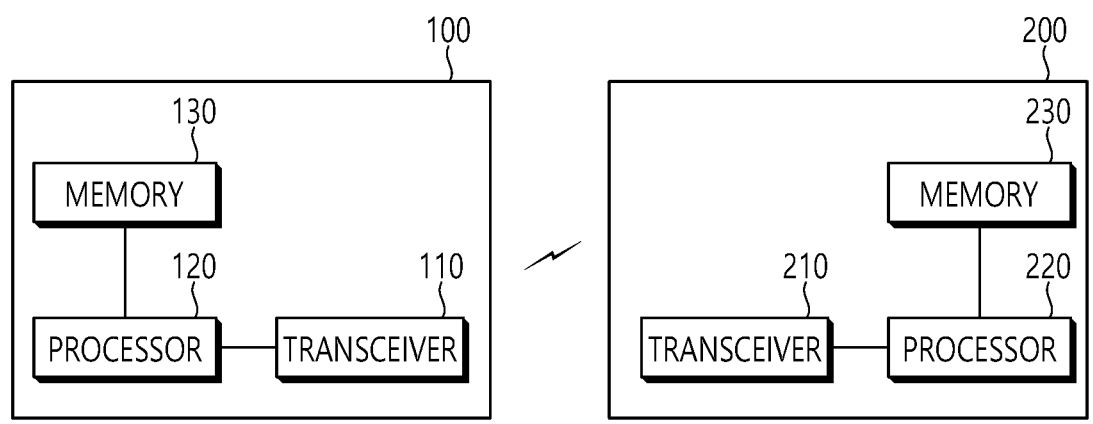
FIG. 12 is a block diagram illustrating a wireless device and a base station, by which a disclosure of this specification is implemented.

FIG. 12 is a Block Diagram Illustrating a Wireless Device and a Base Station, by which the Disclosure of this Specification can be Implemented.

Referring to FIG. 12, a wireless device 100 and a base station 200 may implement the disclosure of this specification.

The wireless device 100 includes a processor 101, a memory 102, and a transceiver 103. Likewise, the base station 200 includes a processor 201, a memory 202, and a transceiver 203. The processors 101 and 201, the memories 102 and 202, and the transceivers 103 and 203 may be implemented as separate chips, or at least two or more blocks/functions may be implemented through one chip.

Each of the transceivers 103 and 203 includes a transmitter and a receiver. When a particular operation is performed, either or both of the transmitter and the receiver may operate. Each of the transceivers 103 and 203 may include one or more antennas for transmitting and/or receiving a radio signal. In addition, each of the transceivers 103 and 203 may include an amplifier configured for amplifying a Rx signal and/or a Tx signal, and a band pass filter for transmitting a signal to a particular frequency band.

Each of the processors 101 and 201 may implement functions, procedures, and/or methods proposed in this specification. Each of the processors 101 and 201 may include an encoder and a decoder. For example, each of the processors 101 and 202 may perform operations described above. Each of the processors 101 and 201 may include an application-specific integrated circuit (ASIC), a different chipset, a logic circuit, a data processing device, and/or a converter which converts a base band signal and a radio signal into each other.

Each of the memories 102 and 202 may include a Read-Only Memory (ROM), a Random Access Memory (RAM), a flash memory, a memory card, a storage medium, and/or any other storage device.

Figure 13:
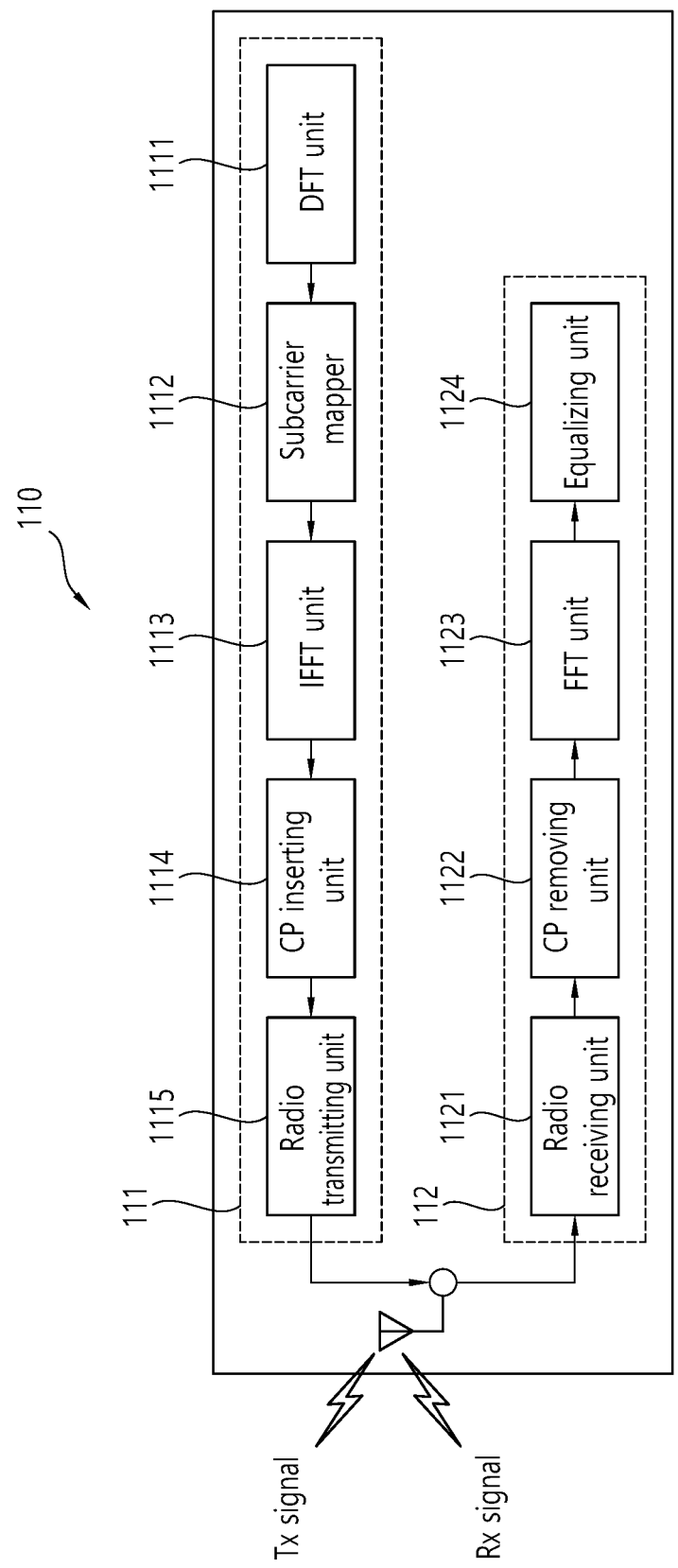
FIG. 13 is a detailed block diagram of a transceiver of the wireless device shown in FIG. 12.

FIG. 13 is a Detailed Block Diagram Illustrating a Transceiver of the Wireless Device Shown in FIG. 12.

Referring to FIG. 13, a transceiver 110 includes a transmitter 111 and a receiver 112. The transmitter 111 includes a Discrete Fourier Transform (DFT) unit 1111, a subcarrier mapper 1112, an IFFT unit 1113, a CP insertion unit 1114, a wireless transmitter 1115. In addition, the transceiver 1110 may further include a scramble unit (not shown), a modulation mapper (not shown), a layer mapper (not shown), and a layer permutator, and the transceiver 110 may be disposed in front of the DFT unit 1111. That is, in order to prevent a peak-to-average power ratio (PAPR) from increasing, the transmitter 111 may transmit information to pass through the DFT unit 1111 before mapping a signal to a subcarrier. A signal spread (or pre-coded for the same meaning) by the DFT unit 111 is subcarrier-mapped by the subcarrier mapper 1112, and then generated as a time domain signal by passing through the IFFT unit 1113.

The DFT unit 111 performs DFT on input symbols to output complex-valued symbols. For example, if Ntx symbols are input (here, Ntx is a natural number), a DFT size may be Ntx. The DFT unit 1111 may be called a transform precoder. The subcarrier mapper 1112 maps the complex-valued symbols to subcarriers of a frequency domain. The complex-valued symbols may be mapped to resource elements corresponding to a resource block allocated for data transmission. The subcarrier mapper 1112 may be called a resource element mapper. The IFFT unit 113 may perform IFFT on input symbols to output a baseband signal for data, which is a time-domain signal. The CP inserter 1114 copies a rear portion of the baseband signal for data and inserts the copied portion into a front part of the baseband signal. The CP insertion prevents Inter-Symbol Interference (ISI) and Inter-Carrier Interference (ICI), and therefore, orthogonality may be maintained even in multi-path channels.

Meanwhile, the receiver 112 includes a wireless receiver 1121, a CP remover 1122, an FFT unit 1123, and an equalizer 1124, and so on. The wireless receiver 1121, the CP remover 1122, and the FFT unit 1123 of the receiver 112 performs functions inverse to functions of the wireless transmitter 1115, the CP inserter 1114, and the IFFT unit 113 of the transmitter 111. The receiver 112 may further include a demodulator.

What is claimed is:

1. A method for performing measurements, the method performed by a user equipment (UE) and comprising:
   receiving, by the UE, measurement gap configuration information,
   wherein the UE is configured for asynchronous dual connectivity (DC) to an evolved universal terrestrial radio access (E-UTRA) cell and a new radio access technology (NR) cell,
   wherein the measurement gap configuration information includes a measurement gap length (MGL),
   wherein the MGL includes one of 3 ms, 4 ms and 6 ms;
   determining a total number of slots to be interrupted during the MGL; and
   performing the measurement during the MGL,
   wherein the total number of slots to be interrupted is determined based on a subcarrier spacing (SCS) of the NR cell and the MGL, and
   wherein the UE does not transmit during any of the total number of slots to be interrupted.

2. The method of claim 1, wherein during the MGL, the UE does not receive any downlink data.

3. The method of claim 1, wherein the SCS of the NR cell includes at least one of 15 kHz, 30 kHz, 60 kHz and 120 kHz.

4. The method of claim 1, wherein when the MGL is 6 ms, the total number of slots to be interrupted is determined as one of:
   7 for a SCS of 15 kHz,
   13 for a SCS of 30 kHz,
   25 for a SCS of 60 kHz and
   49 for a SCS of 120 kHz.

5. The method of claim 1, wherein when the MGL is 4 ms, the total number of slots to be interrupted is determined as one of:
   5 for a SCS of 15 kHz,
   9 for a SCS of 30 kHz,
   17 for a SCS of 60 kHz and
   33 for a SCS of 120 kHz.

6. The method of claim 1, wherein when the MGL is 3 ms, the total number of slots to be interrupted is determined as one of:
   4 for a SCS of 15 kHz,
   7 for a SCS of 30 kHz,
   13 for a SCS of 60 kHz and
   25 for a SCS of 120 kHz.

7. The method of claim 1,
   wherein the E-UTRA cell belongs to a master cell group (MCG) in the DC, and
   wherein the NR cell belongs to a secondary cell group (SCG) in the DC.

8. The method of claim 1, wherein the interruption occurs on a secondary cell group (SCG).

9. A user equipment (UE) comprising:
   a transceiver; and
   a processor, operatively connected to the transceiver, wherein the processor is configured to control the transceiver to receive configuration information on a measurement gap,
      wherein the transceiver is configured for asynchronous dual connectivity (DC) to an evolved universal terrestrial radio access (E-UTRA) cell and a new radio access technology (NR) cell,
   wherein the received configuration information on the measurement gap includes a measurement gap length (MGL),
   wherein the MGL includes one of 3 ms, 4 ms and 6 ms, and
   wherein the processor is further configured to:
   determine a total number of slots to be interrupted during the MGL,
   perform a measurement during the MGL, wherein the total number of slots to be interrupted is determined based on a subcarrier spacing (SCS) of the NR cell and the MGL, and
   control the transceiver such that the transceiver does not transmit during any of the total number of slots to be interrupted.

10. The UE of claim 9, wherein the SCS of the NR cell includes at least one of 15 kHz, 30 kHz, 60 kHz and 120 kHz.

11. The UE of claim 9, wherein when the MGL is 6 ms, the total number of slots to be interrupted is determined to be one of:
    7 for a SCS of 15 kHz,
    13 for a SCS of 30 kHz,
    25 for a SCS of 60 kHz and
    49 for a SCS of 120 kHz.

12. The UE of claim 9, wherein when the MGL is 4 ms, the total number of slots to be interrupted is determined to be one of:
    5 for a SCS of 15 kHz,
    9 for a SCS of 30 kHz,
    17 for a SCS of 60 kHz and
    33 for a SCS of 120 kHz.

13. The UE of claim 9, wherein when the MGL is 3 ms, the total number of slots to be interrupted is determined to be one of:
    4 for a SCS of 15 kHz,
    7 for a SCS of 30 kHz,
    13 for a SCS of 60 kHz and
    25 for a SCS of 120 kHz.

* * * * *